Aug. 30, 1927.
A. JACOBOWITZ
1,640,832
HIGH SPEED FRICTION SAW
Filed March 10, 1926     4 Sheets-Sheet 3
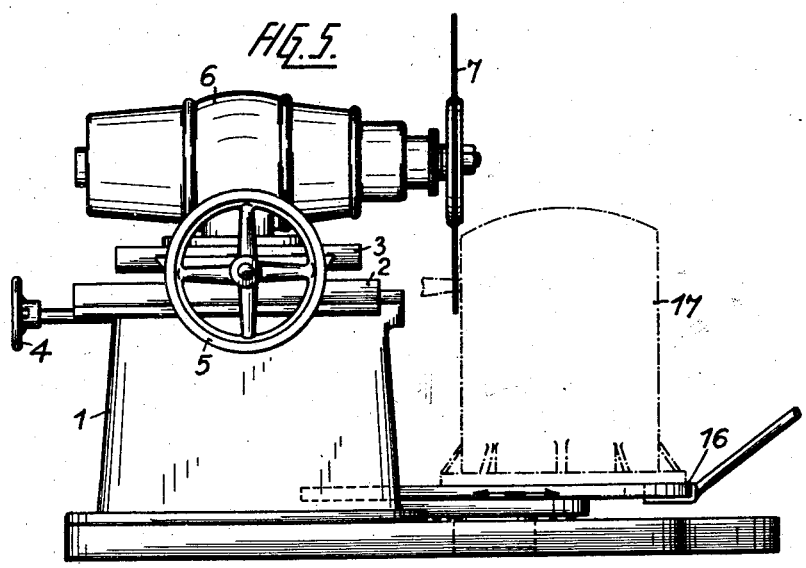
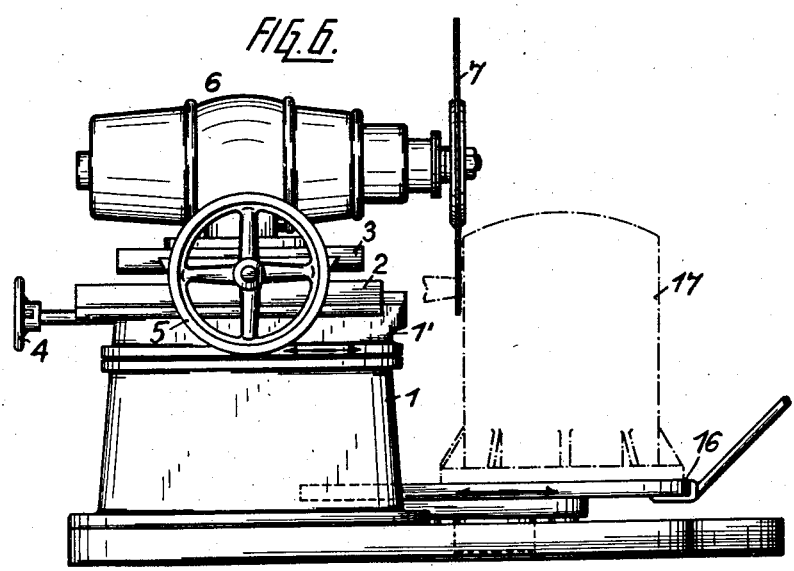

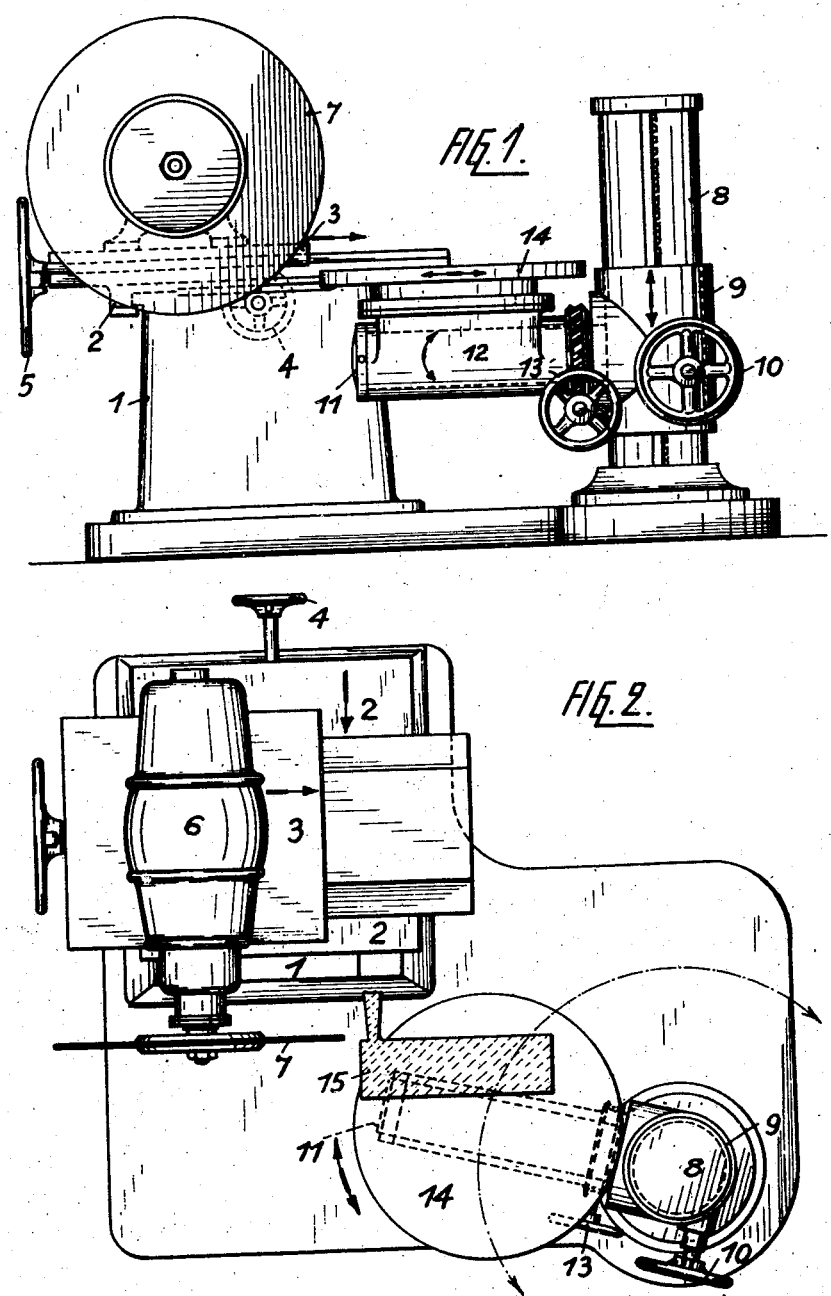

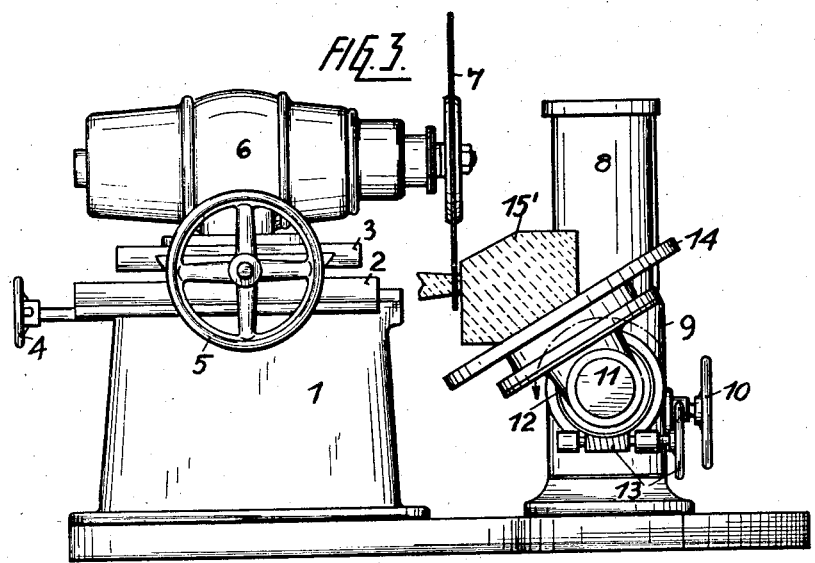
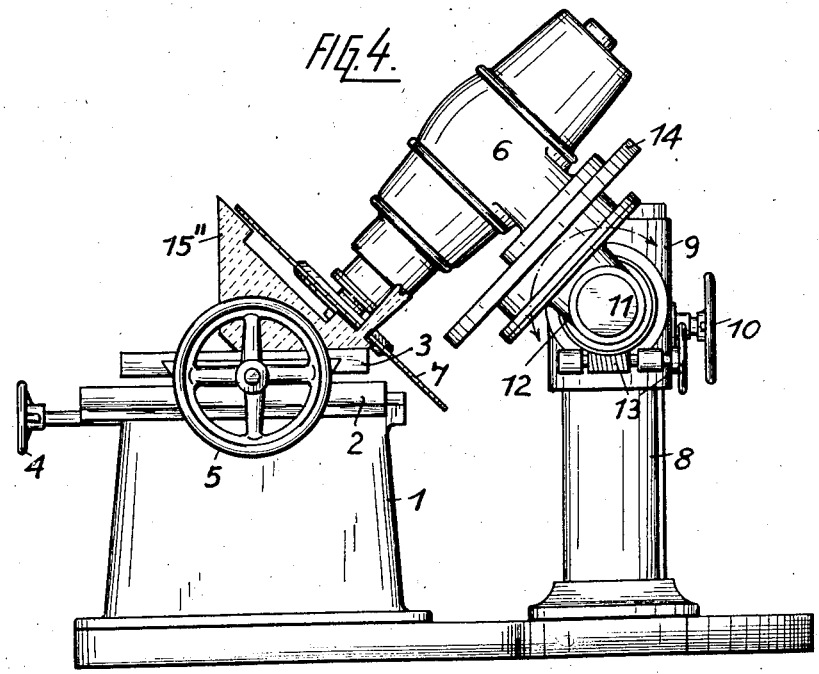

Aug. 30, 1927.

A. JACOBOWITZ 1,640,832

HIGH SPEED FRICTION SAW

Filed March 10, 1926    4 Sheets-Sheet 4

Inventor:
Adolf Jacobowitz
by Herbert G. Ry
Atty.

Patented Aug. 30, 1927.

1,640,832

UNITED STATES PATENT OFFICE.

ADOLF JACOBOWITZ, OF NUREMBERG, GERMANY.

HIGH-SPEED FRICTION SAW.

Application filed March 10, 1926, Serial No. 93,716, and in Germany January 20, 1926.

This invention relates to a high speed friction saw, in which on the shaft of the driving electromotor a rapidly rotating toothless cutting disk is arranged in such a manner, that either the cutting disks can be advanced towards the work piece or vice versa the work piece towards the cutting disk.

In contradistinction to the previous combination of high speed friction saws, in which either the motor with the cutting disk could be advanced only towards the work piece without the possibility of any further shifting or adjusting or in which vice versa the work piece is gradually advanced towards the stationary cutting disk, the present invention is characterized by the novel features stated hereinafter.

In comparison with the up to now known limited possibility of shifting and adjusting, which could be effected only in the direction of cutting, a further far reaching possibility of disposing and adjusting is obtained in the present invention, so that now also work pieces of irregular profiles and bodies having a sloping side, can now be easily and correctly mounted in such a manner, that the cutting disk will cut such a body in a direction vertical to the smallest dimension of the same. On account of the novel construction and adjustability of the cutting disk it will now be possible to easily operate on work pieces for instance in form of cast bodies, the dead parts of which (climbers and runners) are located thus unfavorably, that a separating of said dead parts by the known devices could no be effected on account of the limited possibility of adjusting of said devices.

While the known construction of high speed friction saws on account of the fact, that the motor or the work piece could not be adjusted and shifted only in one direction, permit the cutting to be effected only in one plane determined by the position of the cutting disk and that the work piece itself must be adjusted in the desired cutting plane in a very tiresome manner, it is now possible to forthwith perform cuts in different planes and the cutting disk and the work can be alternately adjusted in regard to each other.

The construction and adjustability obtained according to the present invention is novel in cutting machinery and ensures for the subject matter of the present invention far reaching and up to now unknown possibilities of use and operation.

In the accompanying drawings, in which several modifications of the novel cutting machinery construction with different possibilities of use are illustrated, Fig. 1 is a side view of the first form of construction, Fig. 2 is a plan view of the same, Fig. 3 is a further side view of the same, in which the second adjusting table is shown in different positions in regard to the first cross slide table employed as tool support.

Fig. 4 shows in side view a modification, in which the work piece rests on the cross slide table, while the second adjusting table forms the tool support.

Figs. 5 and 6 show in side view two further modifications in which only the cross slide table is employed, while in front of the same a rotatable plate, carrying the work piece, is arranged.

Figure 7:
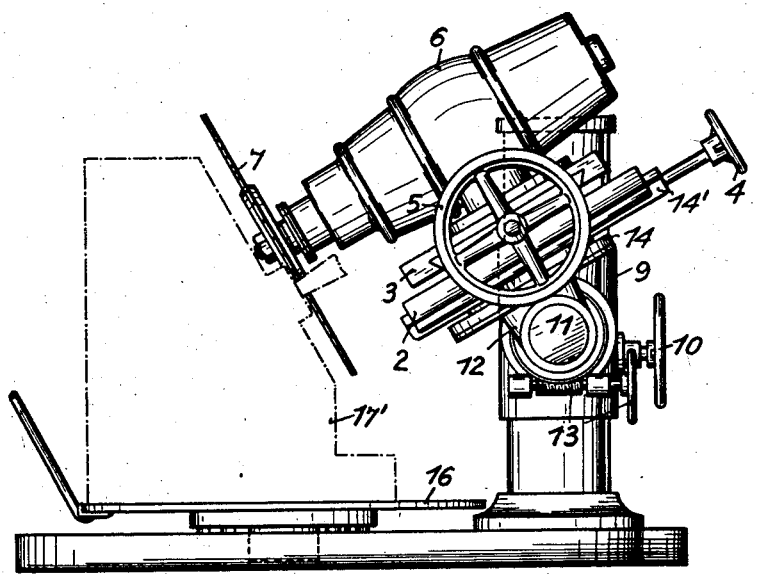

Fig. 7 finally shows a modification in which also a rotatable work piece carrier is provided, while as tool-carrier an oscillatable and adjustable table is employed, on which the electromotor, carrying the cutting disk can be adjusted in two directions, vertically to each other, by means of a cross slide.

In the drawing the reference numeral 1 designates a base, on which cross-slides 2 and 3 are arranged, adapted to be adjusted in regard to the base 1 by means of the handwheel-spindles 4 and 5.

According to Figs. 1-3 the cross slide 2, 3 forms the carrier or support of the electromotor 6, on the shaft of which the cutting disk 7 is secured. The latter can be adjusted into the required cutting plane in regard to the word piece by appropriate adjustment of the cross slide and then can be advanced towards the work piece.

The cross slide 2, 3 with its base 3 is in combination and cooperation with a second table 14, which can be adjusted and oscillated in all directions and which, in this form of construction, forms the support or carrier of the work piece 15, 15'. The adjustable table 14 is supported by a column-shaped post 8 by means of a bracket 11, which with its cylindrical sleeve 9 can be vertically adjusted on the post 8 by means of an adjusting gearing 10.

On the bracket 11 a sleeve 12 is provided, which can be adjusted by means of a gearing 13 and which forms the base proper for the table 14, which can be rotated around its own axis.

The base 1 and slides 2 and 3, on the one hand, and the adjusting table 14, on the other hand, are in alternating action regarding the possibilities of adjustment and thereby present the work piece to be easily and conveniently mounted on account of the mutual complementary adjustment of said tables. It is not necessary any more to place or mount the work piece from the beginning in the correct position for cutting, but the correct adjustment in regard to the cutting disk can be easily effected by utilizing the different possibilities of adjustment, offered by the machinery and then advancing the cutting disk by means of the slide 3 for the performance of the cutting operation toward the work piece 15, Fig. 2, or 15' Fig. 3. The extensive possibility of adjusting, turning and oscillating the second table insures all positions of adjustment in regard to the cutting disk, so that even the most difficult work pieces can be easily adjusted in the correct position for cutting and are resting on their respective base, without being subjected to vibrations.

In the second modification, illustrated in Fig. 4, the construction is reversed to that of the form illustrated in Figs. 1–3, in such a manner, that the adjustable table 14 serves as carrier or support for the electromotor 6 and the cutting disk 7, while the cross slide 2, 3 of the base or table 1 serves for the mounting of the work piece 15''. The possibilities of adjustment are the same as in foregoing construction with the difference only, that now the motor with the cutting disk is adjusted into the required cutting plane in regard to the work piece, while the latter is advanced towards the cutting disk by means of the cross slide.

The adjustable table 14 in combination with the cross slide table 1 insures in both cases the most far reaching possibilities of adjustment between cutting disk and work piece, so that practically all required cutting positions and cuts can be obtained quickly and easily.

In special cases the form of construction according to Figs. 5 and 6 can be provided with one cross slide table 1 only, the slides 2, 3 of which can be adjusted by the gearings, 4, 5 and from the support or carrier for the motor 6 with cutting disk 7.

The work piece 17 in this form of construction is mounted on a table 16, which is suitably arranged as a turning table upon the base plate of the machine.

This form of construction too, which is especially suited for large and heavy work pieces, insures still sufficient freedom of motion and possibilities of adjustment in the mounting of the work piece, towards which then the cutting disk 7 is advanced by the medium of the lower slide 2, while said cutting disk is positioned in the required cutting plane in regard to the work piece by the medium of the upper slide 3.

The possibilities of adjustment of this modification can be increased still by arranging the cross slide 2, 3 with its guide base 1' rotatably on the machine base 1, so that the cutting disk besides the cross adjustment in a horizontal plane, still can be rotated and oscillated around a vertical plane.

Fig. 7 illustrates a further modification of the machine in which the column post table, which can be adjusted and oscillated in any desired direction, forms the support or carrier for the motor 6 with cutting disk 7. In this modification, which too is especially suited for the treatment of large workpieces, a combination of possibilities of adjustment is provided for one table in the same manner, as insured in the constructions according to Figs. 1 to 4 for two separate tables.

The column post 8 has the same construction and possibility of adjustment as in the first and second construction, illustrated in Figs. 1 to 4, however in the present construction the rotating table 14 is provided with a slide bed 14', on which a cross slide 2, 3 is arranged. The latter forms the support or carrier for the motor 6 with cutting disk 7.

By means of the handwheel and adjusting spindles 4, 5 the motor 6 with the cutting disk 7 can be moved by the medium of the cross slide 2, 3 in one plane in two directions, which are vertical to each other, while by the operation of the adjusting devices 10, 11, 13 per se any desirable or required adjustment or oscillation in regard to the column post 8 is made. The work piece 17 is mounted on a plate 16, arranged in front of the adjustable tool carrier and suitably constructed as turning table, which can rotate around an axis or shaft, projecting from the base plate of the machine. In this construction also on account of the various possibilities of adjustment of the cutting disk 7 all required cutting positions can be easily established and accommodated in conformance with the peculiarity of the work piece.

The rotatable adjustment of the cross slide 2, 3 on the base 1, as shown in Fig. 6, can be applied, of course, also to the forms of construction, illustrated in Figs. 1 to 4.

I claim:

1. A high-speed friction saw, comprising, in combination, an electromotor and its shaft, a toothless cutting disk located upon said shaft, a base and on it two slides arranged at right angles with respect to each other, the upper slide carrying said motor with said shaft and disk, a table adapted to receive and hold fast the work-piece and being adapted to be adjusted relatively to said slides in any position, substantially as set forth.

2. A high-speed friction saw, comprising, in combination, an electromotor and its shaft, a toothless cutting disk located upon said shaft, a base and on it two slides arranged at right angles with respect to each other, the upper slide carrying said motor with said shaft and disk, a table adapted to receive and hold the work-piece, a bracket on which said table can be adjusted, and a column on which said bracket can be adjusted, substantially as set forth.

3. A high-speed friction saw, comprising, in combination, an electromotor and its shaft, a toothless cutting disk located upon said shaft, a base and on it two slides arranged at right angles with respect to each other, the upper slide carrying said motor with said shaft and disk, a table adapted to receive and hold fast the work-piece and being adapted to be turned around its own axis and to be adjusted relatively to said slides in any position, substantially as set forth.

In testimony whereof I affix my signature.

ADOLF JACOBOWITZ.